United States Patent
Wu et al.

(10) Patent No.: US 10,581,062 B2
(45) Date of Patent: Mar. 3, 2020

(54) NANOCUBIC $CO_3O_4$/FEW-LAYER GRAPHENE COMPOSITES AND RELATED ANODE COMPONENTS

(71) Applicant: Northwestern University, Evanston, IL (US)

(72) Inventors: Jinsong Wu, Wilmette, IL (US); Junming Xu, Hangzhou (CN); Vinayak P. Dravid, Glenview, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 512 days.

(21) Appl. No.: 14/996,013

(22) Filed: Jan. 14, 2016

(65) Prior Publication Data
US 2016/0204416 A1 Jul. 14, 2016

Related U.S. Application Data

(60) Provisional application No. 62/103,377, filed on Jan. 14, 2015.

(51) Int. Cl.
*H01M 4/00* (2006.01)
*H01M 4/131* (2010.01)
*H01M 4/62* (2006.01)
*H01M 4/1391* (2010.01)
*H01M 4/04* (2006.01)
*H01M 4/52* (2010.01)

(52) U.S. Cl.
CPC .......... *H01M 4/131* (2013.01); *H01M 4/049* (2013.01); *H01M 4/0471* (2013.01); *H01M 4/1391* (2013.01); *H01M 4/625* (2013.01); *H01M 4/523* (2013.01)

(58) Field of Classification Search
CPC .... H01M 4/131; H01M 4/525; H01M 4/0471; H01M 4/049; H01M 4/625; H01M 4/1391; H01M 4/523
See application file for complete search history.

(56) References Cited

U.S. PATENT DOCUMENTS

| | | | | |
|---|---|---|---|---|
| 8,551,650 | B2 * | 10/2013 | Kung | H01B 1/04 429/188 |
| 2012/0064409 | A1 * | 3/2012 | Zhamu | B82Y 30/00 429/221 |
| 2013/0224452 | A1 * | 8/2013 | Ramaprabhu | H01J 1/304 428/209 |

OTHER PUBLICATIONS

Li et al. "Co3O4 mesoporous nanostructures@graphene membrane as an integrated anode for long-life lithium-ion batteries", Journal of Power Sources, vol. 255, 2014, pp. 52-58 (Year: 2014).*
Salavati-Niasari et al. "Synthesis and characterization of Co3O4 nanoparticles by a simple method", Comptes Rendus Chimie, vol. 17, Issue 4, 2014, pp. 352-358 (Year: 2014).*
L. Fei, Q.L. Lin, B. Yuan, M. Naeemi, Y. Xu, Y.L. Li, S.G. Deng, H.M. Luo, "Controlling morphology and enhancing electrochemical performance of cobalt oxide by addition of graphite", Mater. Lett. 98 (2013) 59.

(Continued)

*Primary Examiner* — Nicholas P D'Aniello
(74) *Attorney, Agent, or Firm* — Bell & Manning, LLC

(57) ABSTRACT

$Co_3O_4$ nanocubes as can be homogeneously assembled on a few-layer graphene sheet, such a composite as can be used in conjunction with an anode and incorporated into a high energy lithium-ion battery.

23 Claims, 10 Drawing Sheets

(56) References Cited

OTHER PUBLICATIONS

N. Li, Z. Geng, M. Cao, L. Ren, X. Zhao, B. Liu, Y. Tian, C. Hu, "Well-dispersed ultrafine Mn3O4 nanoparticles on graphene as a promising catalyst for the thermal decomposition of ammonium perchlorate", Carbon 54 (2013) 124.
Y. Hernandez, V. Nicolosi, M. Lotya, et al., "High-yield production of graphene by liquid-phase exfoliation of graphite", Nanotechnol. Nat. 3 (2008) 563.
W.S. Hummers, R.E. Offeman, "Preparation of Graphitic Oxide", J. Am. Chem. Soc. 80 (1958) 1339.
Z.S. Wu, W.C. Ren, L. Wen, L.B. Gao, J.P. Zhao, Z.P. Chen, G.M. Zhou, F. Li, H.M. Cheng, "Graphene Anchored with Co3O4 Nanoparticles as Anode of Lithium Ion Batteries with Enhanced Reversible Capacity and Cyclic Performance" ACA Nano 4 (2010) 3187.
Wu et al., Synthesis of high-quality graphene with a pre-determined number of layers, CARBON 47, Nov. 5, 2008, pp. 493-499.

\* cited by examiner

Fig. 2A
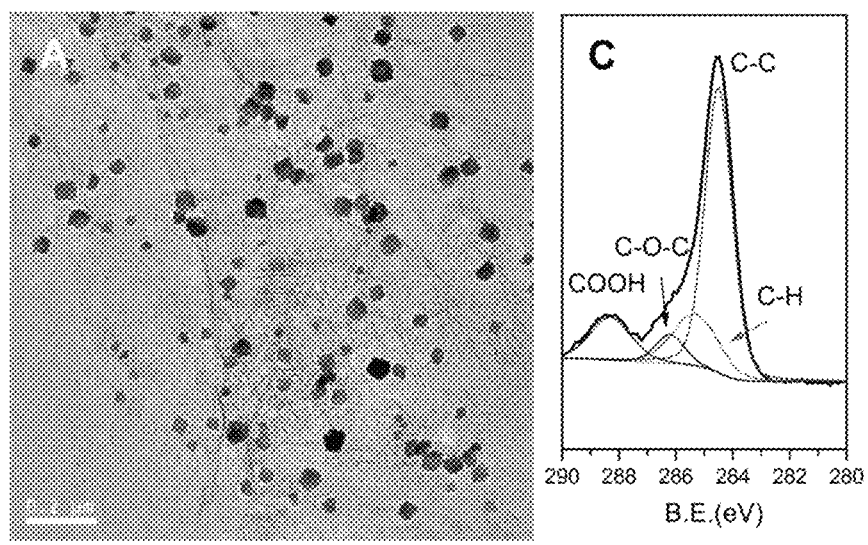
Fig. 2C
Fig. 2B
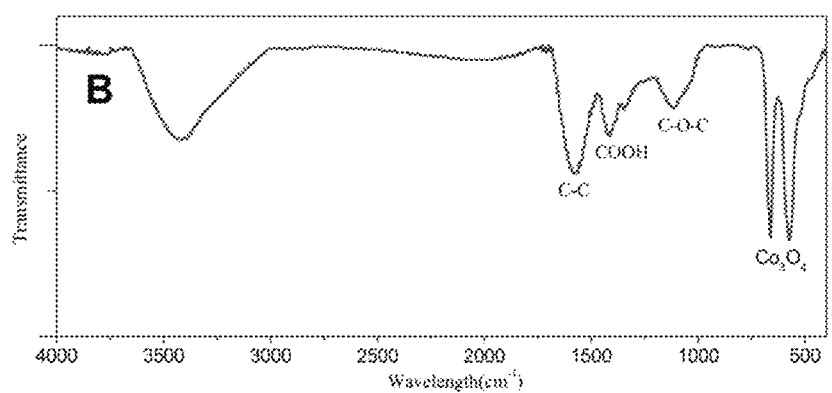

Fig. 6A
Fig. 6B
Fig. 6C
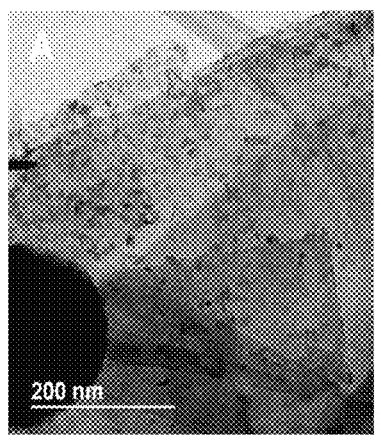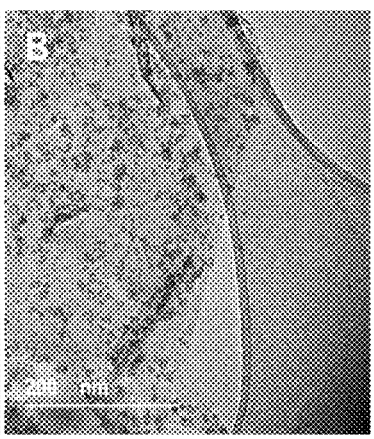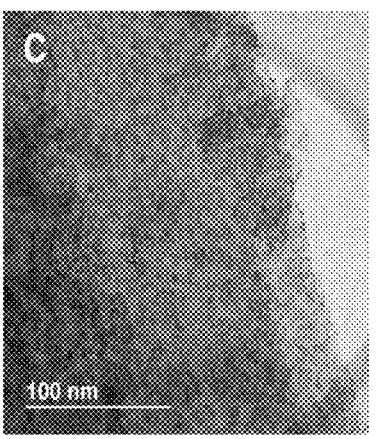

NANOCUBIC CO₃O₄/FEW-LAYER GRAPHENE COMPOSITES AND RELATED ANODE COMPONENTS

This application claims priority to and the benefit of application Ser. No. 62/103,377 filed Jan. 14, 2015, the entirety of which is incorporated herein by reference.

This invention was made with government support under DMR-1121262 awarded by the National Science Foundation. The government has certain rights in the invention.

BACKGROUND OF THE INVENTION

Electrode materials for high power lithium-ion batteries has been an area of recent research and development, to meet increasing energy and power demands, e.g. for electric vehicles and storage media for renewable energy. Most of the transition metal oxides that undergo conversion reaction with Li-ions can offer much larger specific capacities over graphitic carbon which can lead to intercalation reaction with Li-ions. Among them, $Co_3O_4$ has been given special attention owing to its high theoretical capacity (890 mAh $g^{-1}$) and good stability. However, mechanical fractures and structural pulverization induced by volume expansion during charge/discharge cycles are major barriers to developing high power lithium-ion batteries with $Co_3O_4$ and other metal oxides. To improve cycling performance, various $Co_3O_4$ structures, such as nanocage, nanotube, nanofiber, nanowire, micro-flower and nanoplate, and mesoporous morphologies, have been synthesized and tested.

Graphene, a single atomic layer of graphite with large surface area (2600 $m^2$ $g^{-1}$), with good mechanical property and high electrical conductivity, is an ideal substrate on which metal oxides can be deposited to improve cycling performance and reduce electric resistance. Graphene has also been explored for potential use as anode alone for lithium-ion battery, though it has the disadvantage of irreversible capacity. Typically, it has been applied as a support matrix for other guest active nanostructures. Growth of $Co_3O_4$ nanoparticles on graphene and its application as Li-ion battery anode have been reported by many research groups, and it has been noted that its electrochemical properties can be improved by decreasing the oxidation degree of reduced graphite oxide (RGO) when graphite oxide is used as a graphene precursor. For instance, a two-step method has been developed to synthesize homogeneous small metal oxide nanoparticles onto oxidized graphene to improve the electrochemical performance of metal oxide/graphene composites. However, problems persist. As a result, there remains an ongoing concern in the art to provide an anode material to utilize the benefits and advantages available through use of $Co_3O_4$ nanoparticles.

SUMMARY OF THE INVENTION

In light of the foregoing, it is an object of the present invention to provide cobalt oxide-graphene composites, related anode components and/or lithium-ion battery devices and method(s) for their preparation and/or assembly, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide a substantially unoxidized graphene sheet component affording a higher electric conductivity as compared to graphite oxide components of the prior art.

It can also be an object of the present invention to provide a cobalt oxide nanostructure to afford a higher specific capacity and improved cycling stability as compared to metal oxide structures and morphologies of the prior art.

It can also be an object of the present invention, alone or in conjunction with one or more of the preceding objectives, to provide a cobalt oxide-graphene composite for use in an anode component of a lithium-ion power cell/battery to afford enhanced electrochemical properties.

Other objects, features, benefits and advantages of the present invention will be apparent from this summary and the following descriptions of various embodiments, and will be readily apparent to those skilled in the art having knowledge of various metal oxide-graphene composites, anode components and lithium-ion batteries, together with corresponding preparation/assembly techniques. Such objects, features, benefits and advantages will be apparent from the above as taken into conjunction with the accompanying examples, data, figures and all reasonable inferences to be drawn therefrom.

In part, the present invention can be directed to a composite comprising a graphene sheet component comprising a plurality of graphene layers; and nanodimensioned particles comprising $Co_3O_4$ bonded, adsorbed or coupled thereto, such particles as can be dispersed substantially uniformly on such a graphene sheet component. In certain non-limiting embodiments, such a graphene sheet component can comprise 2, 3, 4-about 10 graphene layers, . . . up to about 20 graphene layers, . . . up to about 30 graphene layers, . . . up to about 50 graphene layers, or . . . up to about 100 graphene layers or more. As a separate consideration, such a graphene component can be a mechanical exfoliation product of an expandable graphite source material. Regardless, in certain embodiments, irrespective of layer number, such a graphene sheet component can be substantially unoxidized. In certain such embodiments, each such graphene layer thereof can have two opposed sides, with such nanodimensioned particles coupled to each layer side.

As a separate consideration, in certain embodiments, such a composite can comprise a $Co^{+3}$ cation coupled to a counter ion. In certain such embodiments, such a counter ion can be a carboxylate anion, such an anion as can provide such nanodimensioned particles a cubic morphology. Without limitation, such cubic particles can have an average edge dimension of about 4 nm, and adjacent such cubic particles can have a nanodimensioned distance therebetween.

In part, the present invention can also be directed to a composite comprising a graphene sheet component comprising a plurality of graphene layers, such a graphene sheet component as can be substantially unoxidized; and particles comprising crystalline $Co_3O_4$ coupled thereto, each such particle as can be nanodimensioned and/or as can have a cubic morphology, each such graphene layer as can have two opposed sides and particles as can be dispersed substantially uniformly on each such layer side. Such a cobalt oxide component can be coupled to a counter ion, as discussed above and illustrated elsewhere herein. Without limitation, such cubic particles can be dimensioned and dispersed as discussed above. Regardless, such a composite can incorporated into an anode component of a lithium-ion electric power cell, such a power cell as can be arranged and configured in a battery of power cells.

In part, the present invention can also be directed to a hydrothermal method of preparing a composite comprising an unoxidized few-layer graphene sheet and crystalline $Co_3O_4$ nanocubes. Such a method can comprise providing a medium comprising a few-layer graphene sheet component, aqueous dimethylformamide and cobalt(II) acetate; introducing such a medium to an autoclave or another suitable reaction vessel; and reacting such a medium under seal and at least one of a temperature and a pressure for a time sufficient to hydrothermally provide a composite comprising crystalline $Co_3O_4$ nanocubes coupled to such a few-layer graphene sheet component. In certain embodiments, such a reaction temperature can be greater than about 100° C. In certain such embodiments, such a reaction temperature can be about 120°-about 130° C. Regardless, without limitation, such an aqueous component can have a dimethylformamide: water ratio up to about 8:2(v/v) or higher.

BRIEF DESCRIPTION OF THE DRAWINGS

FIGS. 2A-C. TEM, FTIR and XPS characterization of $Co_3O_4$/GO composite. (A) TEM show aggregations of $Co_3O_4$ nanocrystals with size about 70-100 nm, (B) FTIR and (C) XPS show the oxide group always existed in the $Co_3O_4$/GO composite.

FIGS. 6A-C. The effect of other ratio of DMF:water on the composites. (A) 0:10 show pure water can only get few particles on graphene; (B) 10:0 show particles cannot grow to large particles; (C) 3:7 show lot of particles are formed on graphene, but they are not cubic shaped.

DETAILED DESCRIPTION OF CERTAIN EMBODIMENTS

As relates to certain non-limiting embodiments of this invention, graphene-based nanocomposites were synthesized and tested as electrode materials for high power lithium-ion batteries. In the synthesis of such nanocomposites, a few-layer graphene sheet (FLGS) component, with high electric conductivity, is prepared by sonicating expanded graphite in a DMF solvent. A simple one-pot hydrothermal method was developed to fabricate monodisperse and ultrasmall $Co_3O_4$ nanocubes (about 4 nm in size) on the FLGS. This composite of uniformly dispersed, homogeneously assembled and high crystalline $Co_3O_4$ nanocubes on the FLGS has shown higher capacity and much better cycling stability than counterparts synthesized using GO as a precursor. Products corresponding to stages of hydrothermal synthesis were characterized by TEM, FTIR and XPS to investigate a possible nanocube growth mechanism. $Co(OH)_2$ initially grew homogeneously on the graphene surface, then gradually oxidized to form $Co_3O_4$ nanoparticle seeds, which were then converted to $Co_3O_4$ nanocubes with carboxylate anion. This work also explores the mechanism of nanocrystal growth and its impact on electrochemical properties to provide further insights into the development of nanostructured electrode materials for high power energy storage.

Figure 1A:
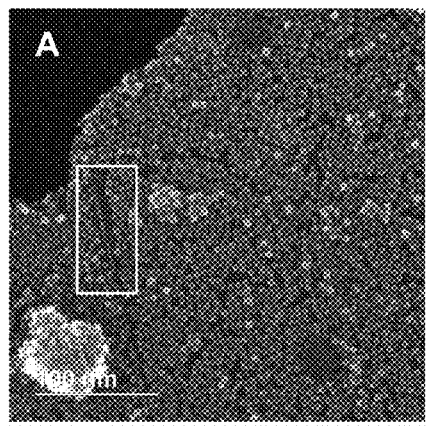
FIGS. 1A-E. $Co_3O_4$ nanocubes on few-layer graphene sheets. The microstructure characterized by (A) Scanning electron microscopy, (B) BF-STEM of the same area with A, (C) High-resolution electron microscopy (HREM), (D) Selected-area electron diffraction, and (E) X-ray powder diffraction.
Figure 1B:
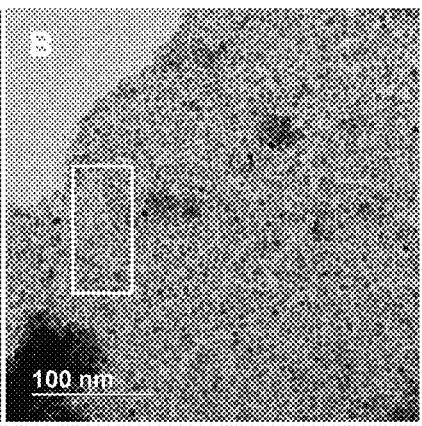
Figure 1C:
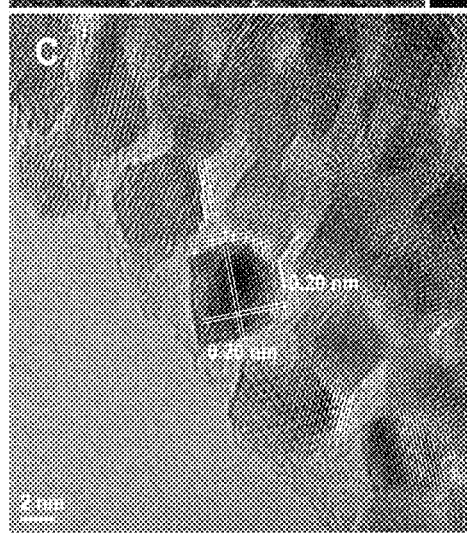
Figure 1D:
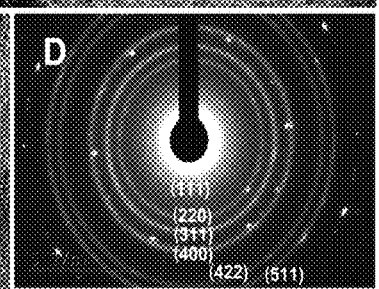
Figure 1E:
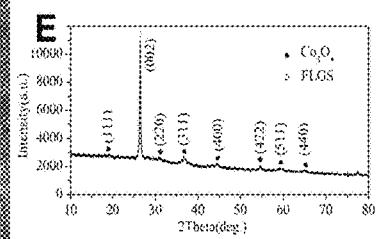

Characterization of nanocomposites. When FLGS was used as a substrate, small and uniformly dispersed $Co_3O_4$ nanocubes can grow on both sides of the graphene layers, as characterized with STM, TEM and XRD. FIGS. 1A and B show SEM and bright-field STEM images of the as-synthesized composite taken from the same area, respectively. While FIG. 1A shows only the nanocubes on the up surface of the FLGS, FIG. 1B shows the nanocubes on both surfaces. Areas marked with white rectangles in FIGS. 1A and B shows the difference between FIG. 1A and B, and nanocubes are clearly distributed on both sides of the graphene. The cubic monodisperse nanoparticles were measured to have an average edge length of 4 nm. The distances between adjacent nanocubes are up to about 10 nanometers or more, such distances which are believed to tolerate the large volume changes in the lithiation/delithiation process and be beneficial to improved electrochemical performance. An HRTEM image of $Co_3O_4$ crystals is shown in FIG. 1C. These nanoparticles are single crystalline, and the lattice fringes of $Co_3O_4$ crystals shows an interplanar spacing of 0.202 nm, which is consistent with the (100) plane of cubic $Co_3O_4$. The surface facets of the nanocubes thus are the {100} lattice plane. Selected area electron diffraction (SAED) pattern (FIG. 1D) and X-Ray diffraction (XRD) pattern (FIG. 1E) of the composite both confirm that these particles on graphene are $Co_3O_4$ nanoparticles. The diffraction rings in SAED pattern are indexed to be (110), (220), (311), (400), (422), (511) of $Co_3O_4$. The relatively high intensive diffraction peak at 26.5° C. in the XRD pattern originated from the graphite layer (200) is an indication that the graphene is not single layer. All the other diffraction peaks are ascribed to the $Co_3O_4$ (JCPDS: No. 78-1969). It shows that these $Co_3O_4$ nanocubes are already in very good crystallinity and further calcination is not necessary.

By comparison, when GO nanosheets are used as graphene precursor, large aggregations of $Co_3O_4$ crystals grow on the GO substrate. As shown in FIG. 2A, cubic shape aggregations of $Co_3O_4$ nanocrystals dimensioned about 70-100 nm can be seen formed on the GO. When the sample is under higher magnification, uniformly distributed $Co_3O_4$ nanocubes, such as those formed on FLGS, are not observed. (The lack of aggregation can denote substantially uniformly dispersed $Co_3O_4$ nanoparticles of the present invention.) With a reaction temperature of 120° C., oxygen is obviously in the GO composite, as shown by the FTIR and XPS spectra in FIGS. 2B and C respectively.

Figure 3:
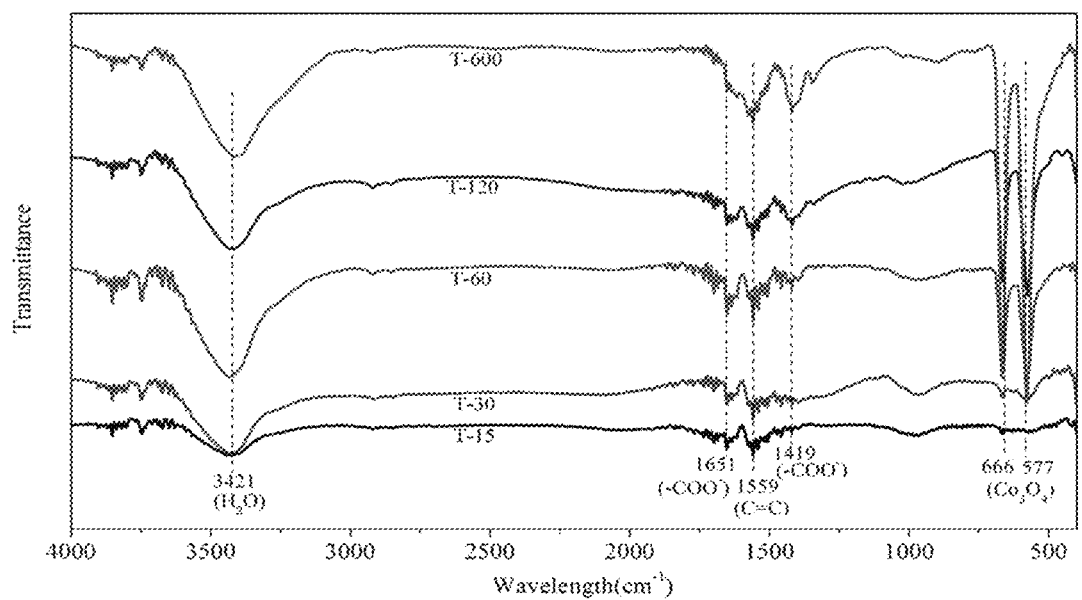
FIG. 3. FTIR spectrum of $Co_3O_4$ nanocubes on few-layer graphene sheets recorded at different reaction times.
Figure 4A:
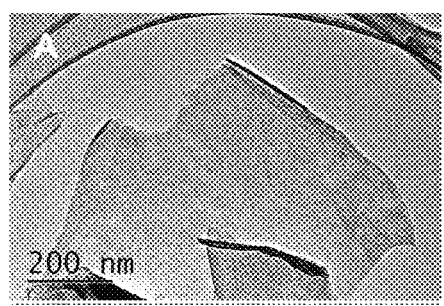
FIGS. 4A-F. TEM images of the as-prepared few-layer graphene (A), and $Co_3O_4$ nanocubes on few-layer graphene sheets formed at different reaction times 15 min (B), 30 min (C), 1 h (D), 2 h (E), and 10 h (F).
Figure 4B:
Figure 4C:
Figure 4D:
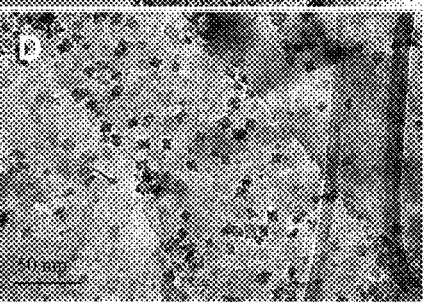
Figure 4E:
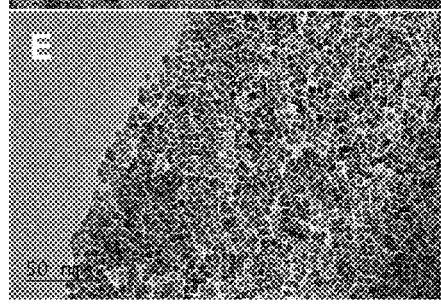
Figure 4F:
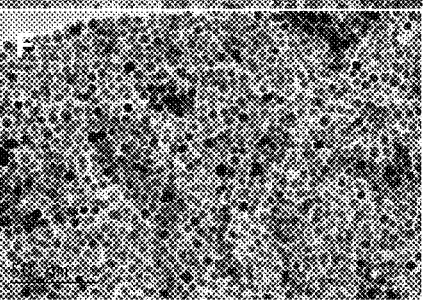
Figure 5A:
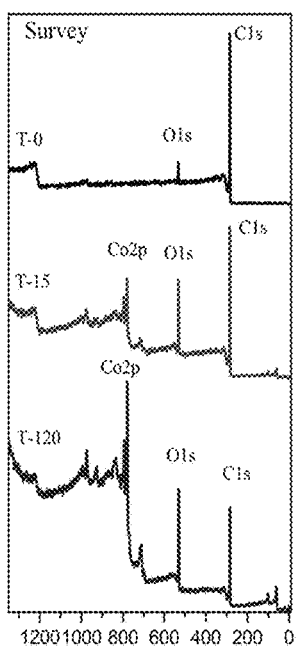
FIGS. 5A-D. XPS investigation of $Co_3O_4$ nanocubes on few-layer graphene sheets for T-0, T-15 and T-120, samples.
Figure 5B:
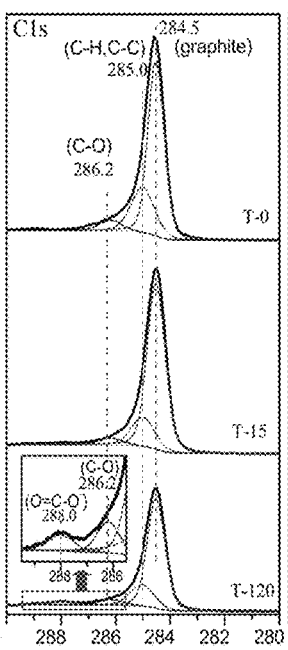
Figure 5C:
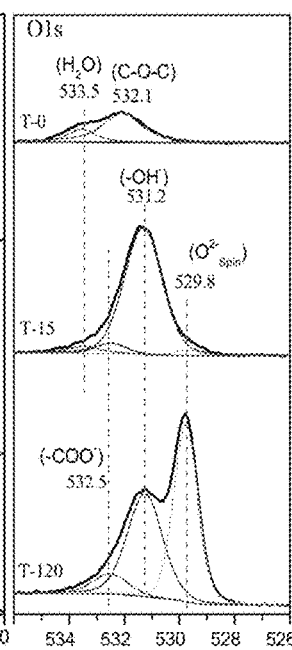
Figure 5D:
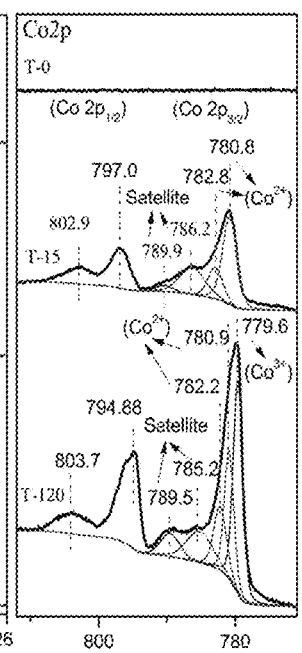

The morphology evolution and growth mechanism. Samples T-15, T-30, T-60, T-120 and T-600—with reaction times 15 min, 30 min, 60 min, 120 min, and 600 min, respectively—were prepared and characterized to study the nucleation and growth mechanism process of $Co_3O_4$ nanocrystals on FLGS. The nucleation of $Co(OH)_2$ and its transformation into $Co_3O_4$ is confirmed by FTIR spectra (FIG. 3). The broad band at 577 $cm^{-1}$ for sample T-15 and T-30 is attributed to $Co(OH)_2$ which is further confirmed by XPS, as discussed below. The strong absorptions at 577 and 666 $cm^{-1}$ are attributed to spinel $Co_3O_4$. (See, Z. S. Wu, W. C. Ren, L. Wen, L. B. Gao, J. P. Zhao, Z. P. Chen, G. M. Zhou, F. Li, H. M. Cheng, ACS Nano 4 (2010) 3187.) The peaks become more intense as reaction time increases, which clearly indicate the increase of weight ratio of $Co_3O_4$ in the product along with the progress of reaction. The band at 1559 $cm^{-1}$ is attributed to the $sp^2$ bond in FLGS. There are no peaks at about 1204 $cm^{-1}$ (C—O—C), indicating that the FLGS is substantially unoxidized. The sharp and symmetric bonds at 1651 $cm^{-1}$ and 1419 $cm^{-1}$ are attributed to the stretching mode of the carbonyl group of the carboxylate counter ion, and the intensity of these peaks gradually increase with reaction time.

FIG. 4 shows TEM images of $Co_3O_4$/graphene samples synthesized with different reaction times. The as-prepared FLGS prior to the hydrothermal reaction is shown in FIG. 4A. At 15 min, small nanoparticles can be observed on the surface of graphene (FIG. 4B), which are identified by both FTIR (FIG. 3) and XPS analysis as $Co(OH)_2$. Some of the $Co(OH)_2$ nanoparticles have already transformed into $Co_3O_4$ nanoparticles (confirmed by XPS in FIG. 5 and possibly due to the presence of active oxidation agents, such as oxygen radicals, in the solvent). At a reaction time of 30 min, there are more small nanoparticles dispersed uniformly on FLGS as shown in FIG. 4C, implying that $Co(OH)_2$ is continuously formed and converted to $Co_3O_4$ nanoparticles. When the reaction time is 60 min, many of $Co_3O_4$ nanocubes are formed on graphene, and these nanocubes are found to be composed of even smaller nanoparticles, as shown in FIG. 4D. When the reaction time is increased to 2 h, the surface of graphene is covered by a large amount of $Co_3O_4$ nanocubes which are smaller in size (compared to FIG. 4D) because of the crystallization, as shown in FIG. 4E. It is interesting to note that even when the reaction time is prolonged to 10 h, as shown in FIG. 4F, there is no further increase in $Co_3O_4$ nanocube size. Without limitation to any one theory or mode of operation, it is speculated that organic groups attached to the surface of cubic $Co_3O_4$ can effectively prevent further growth.

The compositions of the samples synthesized at different reaction times, i.e., sample T-0, T-15 and T-120, were characterized with X-ray photoelectron spectroscopy (XPS), as shown in FIG. 5. The peaks at 284.5 eV, 531.5 eV, 780.6 eV correspond to the characteristic peaks of C1s, O1s, and Co2p, respectively, confirming that carbon, oxygen, and cobalt are the main elements in the samples. The high resolution spectra of C1s, O1s, and Co2p are also shown in FIG. 5. In the C1s spectra, the predominant carbon peaks at 284.5 eV are assigned to graphitic carbon. The peaks at 285.0 eV are assigned to C—H and C—C contamination which tends to induce an apparent asymmetry in the graphitic C1s peak towards higher binding energy. The peak at 286.2 eV is attributed to carbon atoms in a one-oxygen environment and decreased in spectrum of sample T-15, indicating that the FLGS had only a very low degree of oxidation at the beginning of the reaction and could be reduced along with the reaction. On the contrary, GO cannot be reduced in such a process because of the serious oxidation. (See, e.g., FIG. 2C.) The small peaks at 288.0 eV are assigned to carboxylate anion, the lower BE may due to the stronger ionic interactions between carboxylate anion and trivalent cobalt cation on the nanocube facets. This peak collected from sample T-120 is higher than that from sample T-15, implying that carboxylate anion increased with reaction time. Thus, it is reasonable to assume that more carboxylate anions are bound to the surface of $Co_3O_4$ nanocube as the reaction continues. (Again without theoretical or operational limitation, anionic cages may form to shape the $Co_3O_4$ nanocubes). The peak at 531.2 eV is attributed to the oxygen in $Co(OH)_2$, and the peak at 529.7 eV is from oxygen in $Co_3O_4$. In sample T-15, the dominant component is $Co(OH)_2$. In sample T-120, the integral area ratio for peaks at 531.3 and 529.7 eV agrees to that of the peaks of $Co_3O_4$. In the Co2p spectrum, $Co(OH)_2$ for T-15 and $Co_3O_4$ for T-120 are further confirmed by comparing their peaks to those reported in the literature. The Co2p spectrum shows spin orbit splitting into $2p_{1/2}$ and $2p_{3/2}$ components which contain the same chemical information. Therefore, in this study, only $Co2p3_{/2}$ bands are curve fitted. For T-15 sample, the intensive main peak at 780.8 eV and another fitted peak at 782.5 eV are attributed to $Co^{2+}2P_{3/2}$ due to the asymmetric nature of Co peak. The broad peak at 786.2 eV and low peak at 790.4 eV are the satellite peaks of $Co(OH)_2$. For the T-120 sample, the main peak at 779.6 eV is attributed to $Co^{3+}2P_{3/2}$, and 780.9 eV and 782.2 eV can be considered as evidence for distinguishing the divalent oxide from its hydroxides. The satellite peak at 785.2 eV decreases in intensity and shifted to lower BE is also evidence for $Co_3O_4$. Another satellite peak at 789.5 is also found for $Co_3O_4$.

Figure 10A:
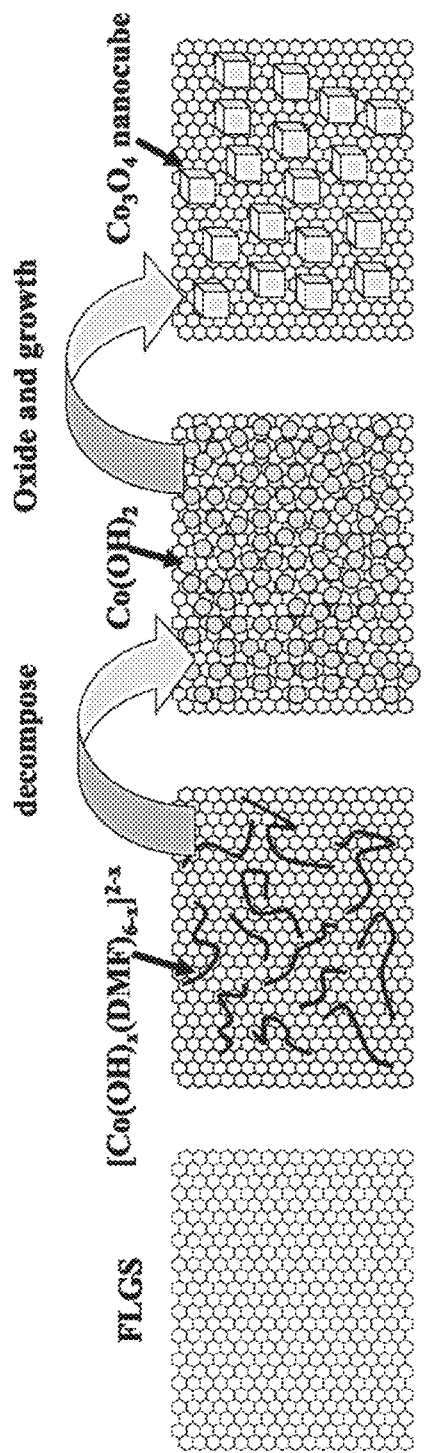
FIGS. 10A-B. Structural schematic diagram on formation process differences between FLGS and GO ((A) $Co_3O_4$ growth on FLGS, (B) $Co_3O_4$ growth on GO).

From the XPS results, it is believed that $Co(OH)_2$ nucleated first on the few layer graphene substrate. The $Co(OH)_2$ nanocrystals are believed to have transformed gradually into $Co_3O_4$ nanocubes in subsequent reaction. Molecules with carboxylate anions are believed to have acted as surfactants forming cubic cages in which $Co_3O_4$ nanocubes formed. A corresponding 3-step growth mechanism of $Co_3O_4$ nanocubes on FLGS can be considered, as proposed in FIG. 10A. In step I, a cobalt coordination compound is formed and absorbed on FLGS. N atoms in DMF can hold so-called lone pair electrons, which has a valence electron pair, without bonding or sharing with other atoms. Though $H^+$ in the $H_2O$ molecule possesses an empty orbital, the $H_2O$ molecules can release OH— anions because of the lone electron pair in DMF, and thus accelerate the formation of coordination compound of $[Co(OH)_x(DMF)_{6-x}]^{2-x}$. This compound is proposed to be adsorbed to a carbon ring of graphene through a π–π reaction. If pure water is used as solvent, the coordination cannot be formed, and few particles are formed on graphene (FIG. 6A).

In step II, the cobalt coordination compound is decomposed to $Co(OH)_2$. These coordination compounds are unstable upon heating, and decompose into large quantities of smaller $Co(OH)_2$ crystal nuclei. During step III, $Co(OH)_2$ is oxidized by $O^{2-}$ radicals and transformed into a $Co_3O_4$ cube. The growth, however, is dependent on the solvent. When pure DMF is used as the hydrothermal solvent, the formed cobalt oxide particles are very small and cannot aggregate into large particles on the surface of graphene (as shown in FIG. 6B). When the volume ratio of DMF to water is 3:7, many non-cubic nanoparticles are deposited (FIG. 6C). Different relative amounts of DMF and water provide different Co₃O₄ boundary energies, indicating that a certain ratio of DMF to water is preferred for the formation of cubic $Co_3O_4$.

Figure 7:
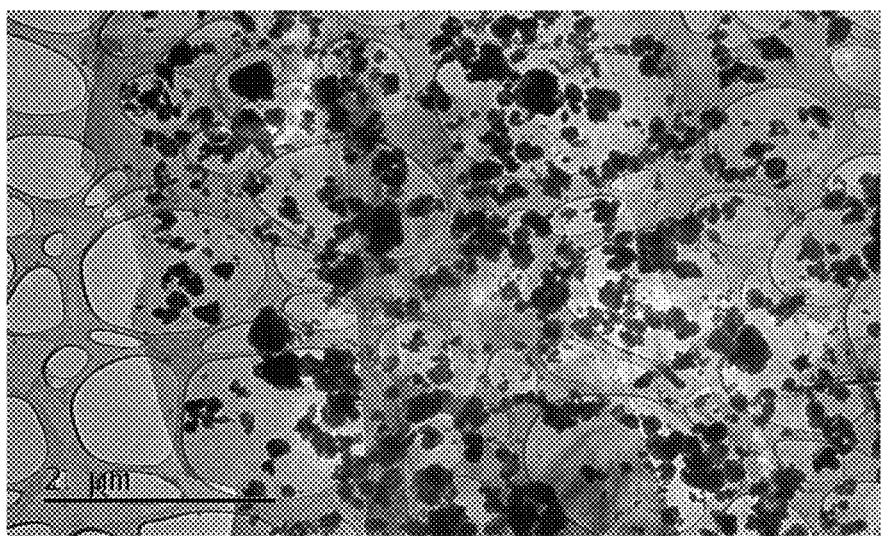
FIG. 7. TEM of $Co_3O_4$/FLGS composite when $CoCl_2$ is used as Co precursor, where only large particles with irregular shape are formed.

The carboxylate group in cobalt(II) acetate tetrahydrate also plays a role on the formation of the cubic shape. It appears to form a surface complex with cobalt cations once it is produced on the FLGS. System-energy-minimizing processes and strong interactions between ion surfactant in the (100) lattice planes tend to favor the formation of $Co_3O_4$ nanocubes, as discussed in the literature. When $CoCl_2$ is used as an alternative to a $Co(Ac)_2$ starting material, the resultant nanoparticles on graphene are very large and not cubic (FIG. 7).

Figure 8:
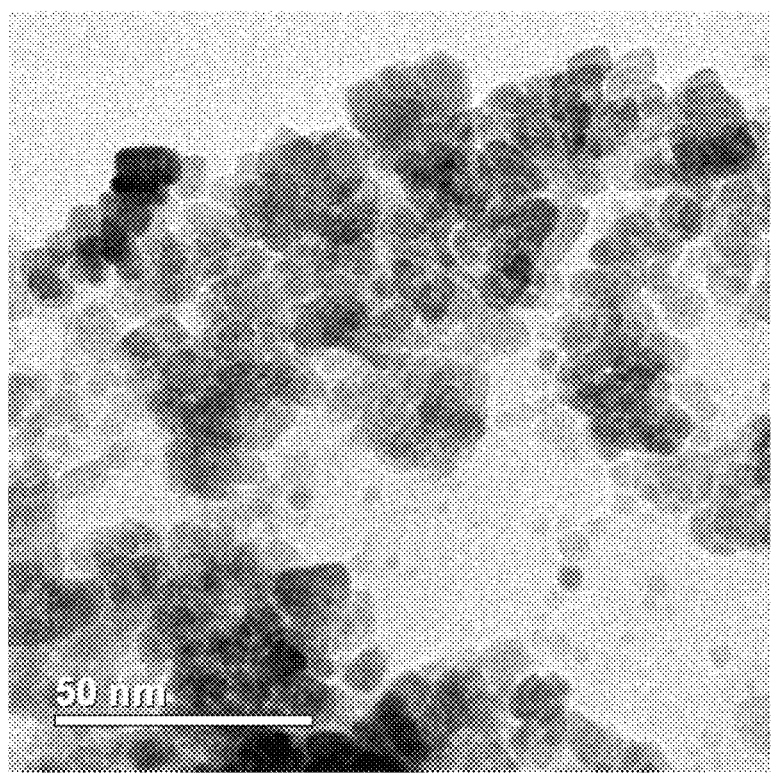
FIG. 8. TEM image of $Co_3O_4$/FLGS composite prepared at 160° C., in which $Co_3O_4$ nanoparticle aggregations have irregular shapes. They are bigger than that those nanocubes synthesized at 120° C.

Reaction temperature is another factor in the growth of cubic $Co_3O_4$. When the temperature is 100° C., small cubic nanoparticles with defects result (not shown). Moreover, some $Co_3O_4$ nanoparticles are found to be not anchored on the graphene. It is believed that high temperature and high pressure facilitate the absorption of nanoparticles on FLGS. However, when the reaction temperature is 160° C., the synthesized $Co_3O_4$ nanoparticles have irregular shapes and an averaged size much larger than those synthesized at 120° C. They tend to aggregate together as well (FIG. 8). It is found that 120° C.-130° C. is a suitable reaction temperature for synthesizing $Co_3O_4$ with uniform cubic shape and homogeneous distribution on FLGS.

Figure 10B:
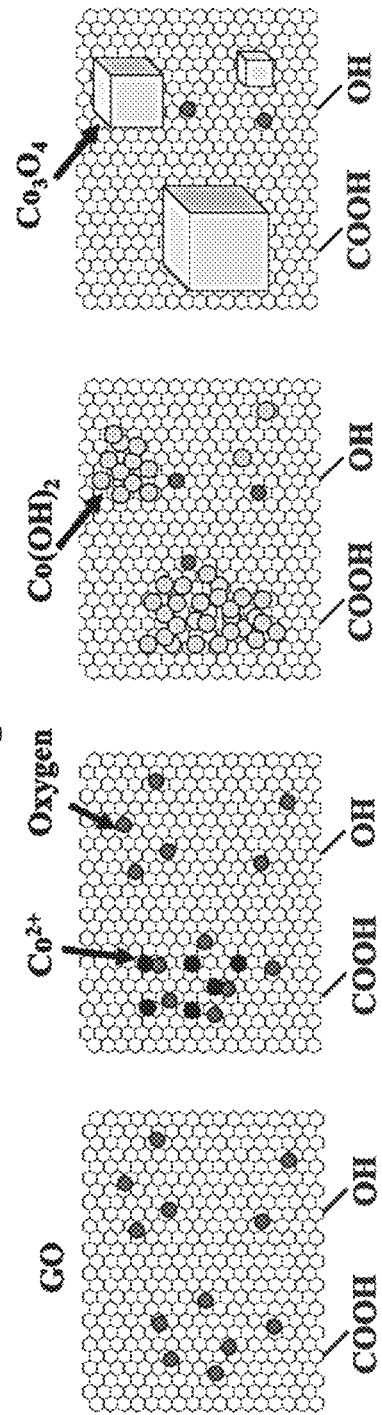

This suggested mechanism is different from the growth mechanism of metal oxide nanoparticles on GO previously studied. (See, e.g., L. Fei, Q. L. Lin, B. Yuan, M. Naeemi, Y. Xu, Y. L. Li, S. G. Deng, H. M. Luo, Mater. Lett. 98 (2013) 59; N. Li, Z. Geng, M. Cao, L. Ren, X. Zhao, B. Liu, Y. Tian, C. Hu, Carbon 54 (2013) 124.) As shown in FIG. 10B, the oxygen functional groups in GO can offer an abundance of binding sites to which $Co^{2+}$ ions can attach via electrostatic interactions. Areas with more oxygen groups can anchor more $Co^{2+}$. As a result, $Co_3O_4$ is not formed homogenously on the surface of GO, and the particles are not uniform in size.

Figure 9A:
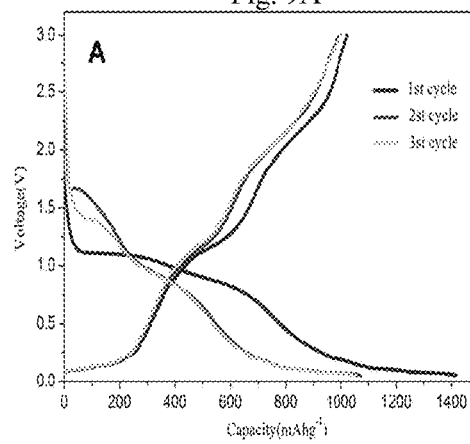
FIGS. 9A-D. Comparison of lithium-ion storage capacity and stability of $Co_3O_4$/FLGS and $Co_3O_4$/RGO. The charge/discharge profiles of the $Co_3O_4$/FLGS (A) and $Co_3O_4$/GO (B) in the initial three cycles at 50 mA $g^{-1}$. (C) Comparison of the rate capacities of $Co_3O_4$/FLGS and $Co_3O_4$/GO composites. (D) The Nyquist plots of $Co_3O_4$/FLGS and $Co_3O_4$/GO electrodes.
Figure 9B:
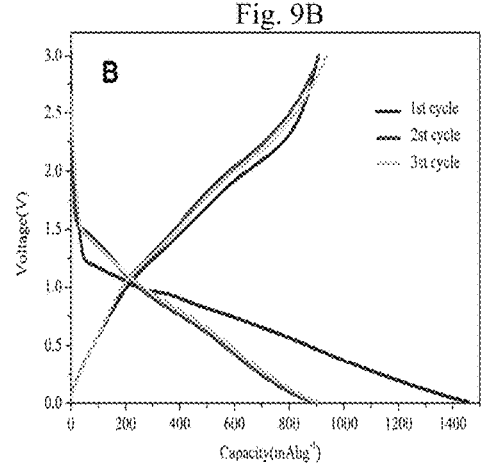

Property test as anode of lithium-ion battery. Coin-type batteries using the as-prepared $Co_3O_4$/FLGS and $Co_3O_4$/GO composites as electrodes were fabricated and comparatively evaluated for lithium storage properties. FIGS. 9A and B show, respectively, the charge/discharge profiles of the $Co_3O_4$/FLGS and $Co_3O_4$/GO composites in the initial three cycles at 50 mA g$^{-1}$. The first discharge and charge capacities were 1417 mAh g$^{-1}$ and 1022 mAh g$^{-1}$ for $Co_3O_4$/FLGS, and 1460 mAh g$^{-1}$ and 905 mAh g$^{-1}$ for $Co_3O_4$/GO, respectively. Both are larger than the theoretical capacity of bulk $Co_3O_4$ (890 mAh g$^{-1}$) and graphite (372 mAh g$^{-1}$). The extra high discharge capacity may be caused by the high electrochemical active surface area of graphene, and the grain boundary area of the nanosized $Co_3O_4$ particles. $Co_3O_4$/FLGS and $Co_3O_4$/GO have similar initial charge and discharge capacities. However, the Coulombic efficiency (charge capacity/discharge capacity) of the $Co_3O_4$/FLGS is higher than that of $Co_3O_4$/GO, implying the advantage of homogenous and small $Co_3O_4$ nanocubes in $Co_3O_4$/FLGS.

Figure 9C:
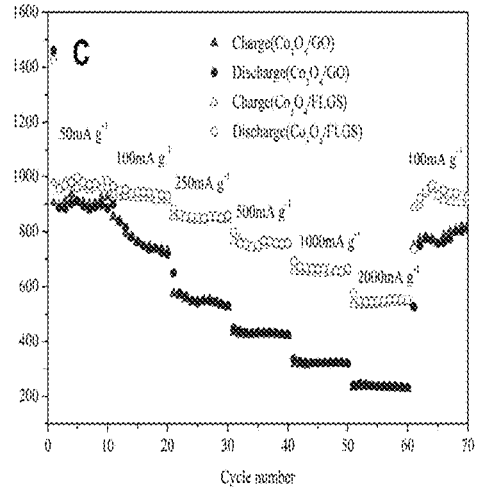

FIG. 9C shows the rate capacities of $Co_3O_4$/FLGS and $Co_3O_4$/GO composites. Reversible capacities for $Co_3O_4$/FLGS are consistently higher than those of $Co_3O_4$/GO in the cycles with different current rates. When the rate was reset to the initial 100 mA g$^{-1}$ after the cycles, the capacities of both $Co_3O_4$/FLGS and $Co_3O_4$/GO go back to their respective original capacities. However, reversible capacities at various rates for $Co_3O_4$/GO are reduced more rapidly than $Co_3O_4$/FLGS. The excellent rate capacity and cycling stability (FIG. 10) of $Co_3O_4$/FLGS may be due to the extremely small size of $Co_3O_4$ nanocubes and the gap between them. This could prevent the aggregation of $Co_3O_4$ in the processes of lithiation and delithiation. Furthermore, the FLGS can provide good conductivity and it may also help to improve transport kinetics of electrons and ions, thus improving the rate capacities.

Figure 9D:
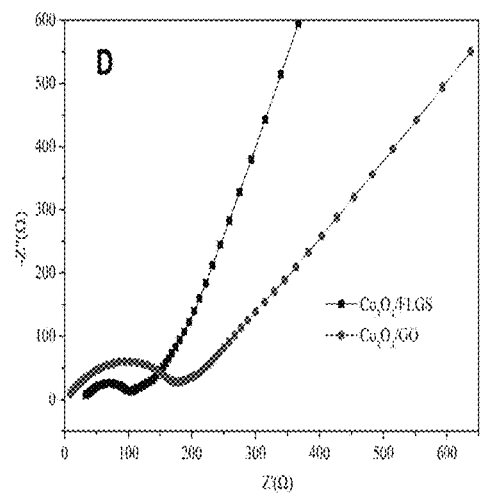

EIS measurements, which can prove the transport kinetics of electrons and ion ability, were carried out. The Nyquist plots of $Co_3O_4$/FLGS and $Co_3O_4$/GO electrodes are shown in FIG. 9D. A typical data point arc in the high-medium frequency region can be ascribed to the charge-transfer resistance. The radius for the $Co_3O_4$/FLGS are smaller than that for the $Co_3O_4$/GO arc, implying that $Co_3O_4$/FLGS composite electrode exhibits faster charge-transfer and has smaller electrochemical reaction resistance than that of $Co_3O_4$/GO. At the low frequency region, inclined lines can be ascribed to the mass-transfer process. The steeper tail of the $Co_3O_4$/FLGS electrode indicates lower ion diffusion resistance compared to the $Co_3O_4$/GO electrode. Thus, the $Co_3O_4$/FLGS composite electrode shows a high electrical conductivity, a rapid charge transfer process and good lithium ion reaction kinetics.

EXAMPLES OF THE INVENTION

The following non-limiting examples and data illustrate various aspects and features relating to the composites, anodes and/or methods of the present invention, including the assembly of a lithium-ion power cell comprising cobalt oxide-graphene composite anode components, as are available through the synthetic methodologies described herein. In comparison with the prior art, the present composites, anodes and methods provide results and data which are surprising, unexpected and contrary thereto. While the utility of this invention can be illustrated through the use of several composites, anodes and components thereof, it will be understood by those skilled in the art that comparable results are obtainable with various other composites, anodes and corresponding components, as are commensurate with the scope of this invention.

Example 1

Hydrothermal Synthesis of FLGS/$Co_3O_4$ nanocomposite. All of the chemicals used in the current study were purchased from commercial sources at an analytical purity grade. Sonication was reported as a method to prepare graphene (See, Y. Hernandez, V. Nicolosi, M. Lotya, et al., Nat. Nanotechnol. 3 (2008) 563.) FLGS could be obtained using such a simple sonication process. In a typical synthesis, expanded graphite (15 mg) was added into a mixed organic solution of DMF and water (10 ml, volume ratio 8:2) and sonicated for 2 h to form an FLGS suspension. Cobalt (II) acetate tetrahydrate (200 mg) was then added to this suspension and stirred to form a uniform solution. Then, the suspension was put into a Teflon-lined autoclave of suitable volume and sealed at room temperature. The stainless steel autoclave was then heated and kept at 120° C. for 2 h. After the autoclave was subsequently cooled to ambient temperature, the precipitate was collected by centrifugation and washing repeatedly with ethanol, and then dried in an oven at 60° C. In order to understand the hydrothermal reaction/product formation process, samples under different reaction times were obtained and identified with a T-X designation, where X corresponds to reaction time in minutes. GO prepared using Hummer's method was used for purpose of comparison and to replace few layer graphene, while other parameters and processes remain the same. (See, W. S. Hummers, R.E. Offeman, J. Am. Chem. Soc. 80 (1958) 1339.)

Example 2

Material characterizations. The as-prepared samples (T-X) were investigated with X-ray diffraction (XRD, Shimadzu XRD-6000,CuKα radiation, 1.5406 Å), Fourier transform infrared spectroscopy (FTIR, Thermo Nicolet, Nexus 870 spectrometer), X-ray photoelectron spectroscopy (XPS, Thermo ESCALab 250iX). Morphologies of the as-prepared samples were examined by scanning electron microscopy and transmission electron microscopy (Hitachi HD-2300 STEM, HT-7700 TEM and JEOL-2100F TEM). TEM samples were prepared by dispersing a sample in an ultrasonic alcohol for 5 min; a drop of this suspension was placed onto a carbon-coated copper grid; and the grid was then dried at room temperature.

Example 3

Anode performance measurements for lithium-ion batteries. Coin-type lithium-ion batteries were assembled in an argon-filled glove-box, where both moisture and oxygen levels were less than 1 ppm. The working electrodes were fabricated by mixing as-prepared sample: carbon: poly(vinyldifluoride) (PVDF) with a weight ratio of 70:20:10 in N-methylpyrrolidone (NMP) solvent and then pasting onto copper foils. Lithium foils were used as counter/reference electrodes and the electrolyte was a solution of 1 M $LiPF_6$ in ethylene carbonate (EC)/dimethyl carbonate (DMC) (1/1, w/w). The cells were tested on a NEWARE multichannel battery test system with galvanostatic charge/discharge technique in a voltage range of 0.01-3.0 V. Electrochemical impedance spectroscopy (EIS) measurements were carried out on CHI600E chemistry workstation by applying a perturbation voltage of 10 mV in a frequency range from 10 kHz to 0.01 Hz.

As demonstrated, few-layer graphene mechanically exfoliated from expandable graphite has shown much better properties than graphite oxide in fabricating nanostructured electrode materials for lithium-ion batteries. Cubic $Co_3O_4$ nanocubes at a size of about 4 nm on one side can be homogenously distributed on the surface of few-layer graphene by a simple hydrothermal method. By investigating the samples at different reaction times with TEM, FTIR and XPS, the formation mechanism of the cubic $Co_3O_4$ nanocubes on graphene was studied. Results indicate formation of $[Co(OH)_x(DMF)_{6-x}]^{2-x}$ and absorption on graphene carbon with π-π reaction, decomposition of $[Co(OH)_x(DMF)_{6-x}]^{2-x}$ to $Co(OH)_2$ on graphene, and growth of nano cubic $Co_3O_4$ nanocubes. By contrast, the electronegativity of a GO surface may suppress the uniform nucleation of $Co(OH)_2$ and thus the growth of small $Co_3O_4$ nanocubes. The $Co_3O_4$/FLGS has shown better electrochemical properties than $Co_3O_4$/GO, which may be attributed to good electric conductivity of FLGS and uniformly dispersed, small $Co_3O_4$ nanocubes.

We claim:

1. A composite comprising a graphene sheet component comprising a plurality of graphene layers; and particles comprising $Co_3O_4$ coupled thereto, each said particle nanodimensioned, said particles dispersed substantially uniformly on said graphene sheet component, wherein said graphene component is a mechanical exfoliation product of an expandable graphite source material which has not been subjected to an oxidation step so that said graphene sheet component is substantially unoxidized, and wherein $Co^{+3}$ cations at a surface of said $Co_3O_4$ particles are bound to organic counter ions in the form of an anionic cage surrounding the $Co_3O_4$ particles, wherein said particles have a cubic morphology and said cubic particles have an average edge dimension of about 4 nm.

2. The composite of claim 1 wherein said organic counter ions are carboxylate anions.

3. The composite of claim 1 wherein adjacent said cubic particles have a nanodimensioned distance therebetween.

4. The composite of claim 1 wherein said graphene sheet component comprises about 10- about 20 graphene layers.

5. The composite of claim 1 wherein each said graphene layer has two opposed sides, and said particles are coupled to each side of a said graphene layer.

6. A composite comprising a graphene sheet component comprising 2- about 30 graphene layers, said graphene sheet component substantially unoxidized; and particles comprising crystalline $Co_3O_4$ coupled thereto, each said particle nanodimensioned and having a cubic morphology, each said graphene layer having two opposed sides and said particles dispersed substantially uniformly on each said side of a said graphene layer, wherein said graphene component is a mechanical exfoliation product of an expandable graphite source material which has not been subjected to an oxidation step to provide said substantially unoxidized graphene sheet component, and wherein $Co^{+3}$ cations at a surface of said $Co_3O_4$ particles are bound to organic counter ions in the form of an anionic cage surrounding the $Co_3O_4$ particles, wherein said cubic particles have an average edge dimension of about 4 nm.

7. A composite of claim 6 wherein said organic counter ions are carboxylate anions.

8. The composite of claim 6 wherein adjacent said cubic particles have a nanodimensioned distance therebetween.

9. The composite of claim 6 wherein said graphene sheet component comprises about 10- about 20 graphene layers.

10. The composite of claim 6 incorporated into an anode component of a lithium-ion electrical power cell.

11. A lithium-ion electrical power cell, said cell comprising an anode comprising a composite comprising a graphene sheet component comprising a plurality of graphene layers, said graphene sheet component substantially unoxidized; and particles comprising $Co_3O_4$ coupled thereto, each said particle nanodimensioned and having a cubic morphology, said particles dispersed substantially uniformly on said graphene sheet component, wherein said graphene component is a mechanical exfoliation product of an expandable graphite source material which has not been subjected to an oxidation step to provide said substantially unoxidized graphene sheet component, and wherein $Co^{+3}$ cations at a surface of said $Co_3O_4$ particles are bound to organic counter ions in the form of an anionic cage surrounding the $Co_3O_4$ particles, wherein said cubic particles have an average edge dimension of about 4 nm.

12. The power cell of claim 11 wherein each said graphene layer has two opposed sides, and said particles are coupled to each side of a said graphene layer.

13. The power cell of claim 11 arranged in a battery of said power cells.

14. A hydrothermal method of preparing the composite of claim 1, said method comprising:
providing a medium comprising the substantially unoxidized graphene sheet component, aqueous dimethylformamide, and cobalt(II) acetate, said graphene sheet component comprising 2- to about 30 graphene layers;

introducing said medium to an autoclave reaction vessel; and reacting said medium under seal and at least one of a temperature and a pressure for a time sufficient to hydrothermally provide the composite of claim 1.

15. The method of claim 14 wherein said temperature is about 120°- about 130° C.

16. The method of claim 14 wherein said aqueous dimethylformamide is about 8:2 (v/v) dimethylformamide:water.

17. The method of claim 14 wherein said reaction is in one vessel without transfer of reaction intermediate compounds.

18. The composite of claim 1 wherein the substantially unoxidized graphene sheet component is characterized by the absence of a peak at about 1204 $cm^{-1}$ as measured using Fourier transform infrared spectroscopy.

19. The power cell of claim 11 wherein said graphene sheet component comprises about 10- about 20 graphene layers.

20. The composite of claim 1, wherein the organic counter ions are acetate anions.

21. The composite of claim 6, wherein the organic counter ions are acetate anions.

22. The power cell of claim 11, wherein the organic counter ions are acetate anions.

23. A composite comprising a graphene sheet component comprising a plurality of graphene layers; and particles comprising $Co_3O_4$ coupled thereto, each said particle nanodimensioned, said particles dispersed substantially uniformly on said graphene sheet component, wherein said graphene component is a mechanical exfoliation product of an expandable graphite source material which has not been subjected to an oxidation step so that said graphene sheet component is substantially unoxidized, and wherein $Co^{+3}$ cations at a surface of said $Co_3O_4$ particles are bound to acetate anions, wherein said $Co_3O_4$ particles have a cubic morphology and an average edge dimension of about 4 nm.

* * * * *